Nov. 28, 1950     T. R. CHRISTOPHER     2,532,148
THREADING TOOLHOLDER WITH ADJUSTABLE LIMIT STOP
Filed Jan. 10, 1946     3 Sheets-Sheet 1
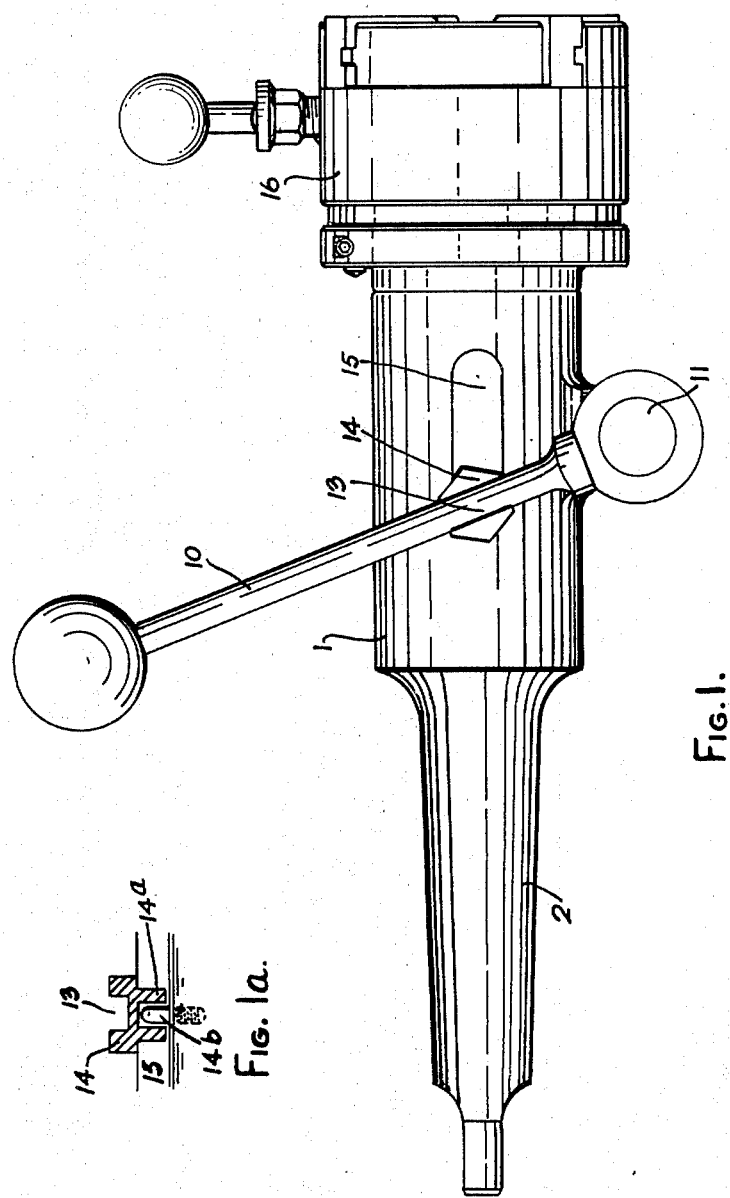
INVENTOR,
TERENCE REGINALD CHRISTOPHER;
BY
ATTORNEY.

Nov. 28, 1950  T. R. CHRISTOPHER  2,532,148
THREADING TOOLHOLDER WITH ADJUSTABLE LIMIT STOP
Filed Jan. 10, 1946  3 Sheets-Sheet 2

Inventor
Terence R. Christopher

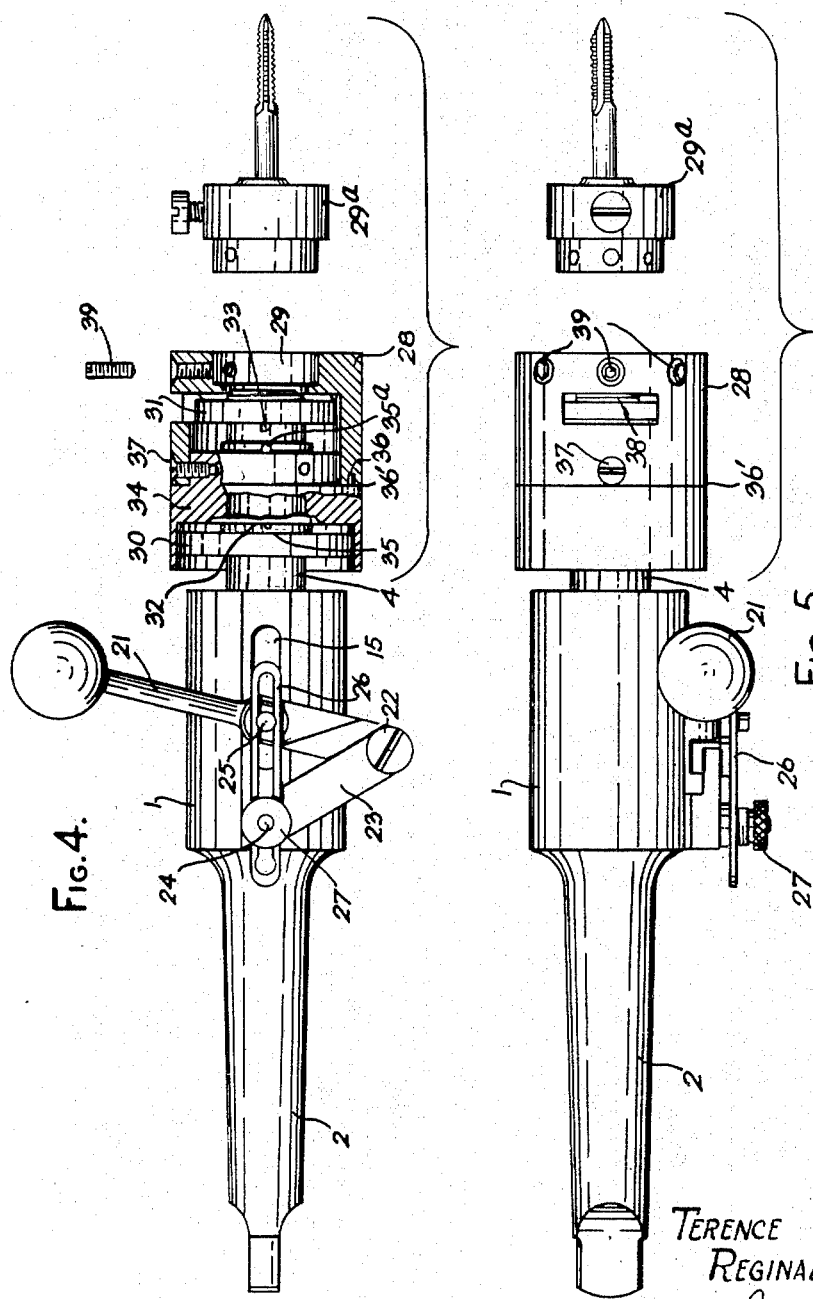

Patented Nov. 28, 1950

2,532,148

UNITED STATES PATENT OFFICE 2,532,148

THREADING TOOLHOLDER WITH ADJUSTABLE LIMIT STOP

Terence Reginald Christopher, London, England

Application January 10, 1946, Serial No. 640,199
In Great Britain January 17, 1945

4 Claims. (Cl. 10—89)

1

The invention relates to devices for use in the cutting of screw threads, either internal or external, the drilling of holes or other machining operations which have to be effected to a determined length or depth, and particularly in connection with repetition work.

A large variety of work machined on centre lathes requires screw threading. This has usually to be undertaken by laborious and experienced manual screw-cutting, or if the quantity is considerable, that is to say, in the case of repetition work, another machine tool such as a capstan lathe has to be employed to speed production and to reduce cost.

These methods of operating are avoided by the invention as it enables the screw threading to be readily and rapidly effected on a centre lathe. It ensures accurate screwing with concentric threads along a determined length. It further facilitates drilling and like machining operations on a centre lathe in cases where the operations have to be effected to a determined depth.

The device according to the invention comprises a body having a stem shaped to fit the tail stock of a centre lathe, a tool-holder carrying dies, a tap, drill or other tool, and having a stem which can slide axially in, but cannot rotate in the body, means for axially sliding the tool-holder stem relatively to the body, and adjustable means for limiting the advancing sliding axial movement of the tool-holder stem in the body to determine the length of screw-thread to be cut or the depth of drilling or machining to be effected.

The tool-holder may carry a self-opening die-head, or be fitted with a collet to receive a tap, drill or other tool.

In order to facilitate screwing operations with a tool-holder fitted with a non-self-opening die head with button dies, or a tap, the tool-holder is preferably mounted independently in relation to the tool-holder stem, and clutching or engaging mechanism is provided, so that during the advance and withdrawal the tool-holder is clutched to its stem and constrained from rotating, but when it reaches the predetermined limit of its advance, it is free to rotate with the workpiece. The clutch or engagement mechanism is such that during the advancing and screwing, the tool-holder can resist the tendency to rotate in one direction and during the withdrawal, it can resist the tendency to rotate in the opposite direction, when the lathe, if fitted with a reverse drive, rotates the workpiece in the reverse direction.

2

In the drawings:

Figure 1 is a rear side elevation of one form of the device.

Figure 1A is a fragmentary detail view showing the handle attachment in Figure 1.

Figure 4 is a rear elevation, partly in section, of another form of the device.

Figure 5 is a top plan view corresponding to Figure 4.

Figure 2:
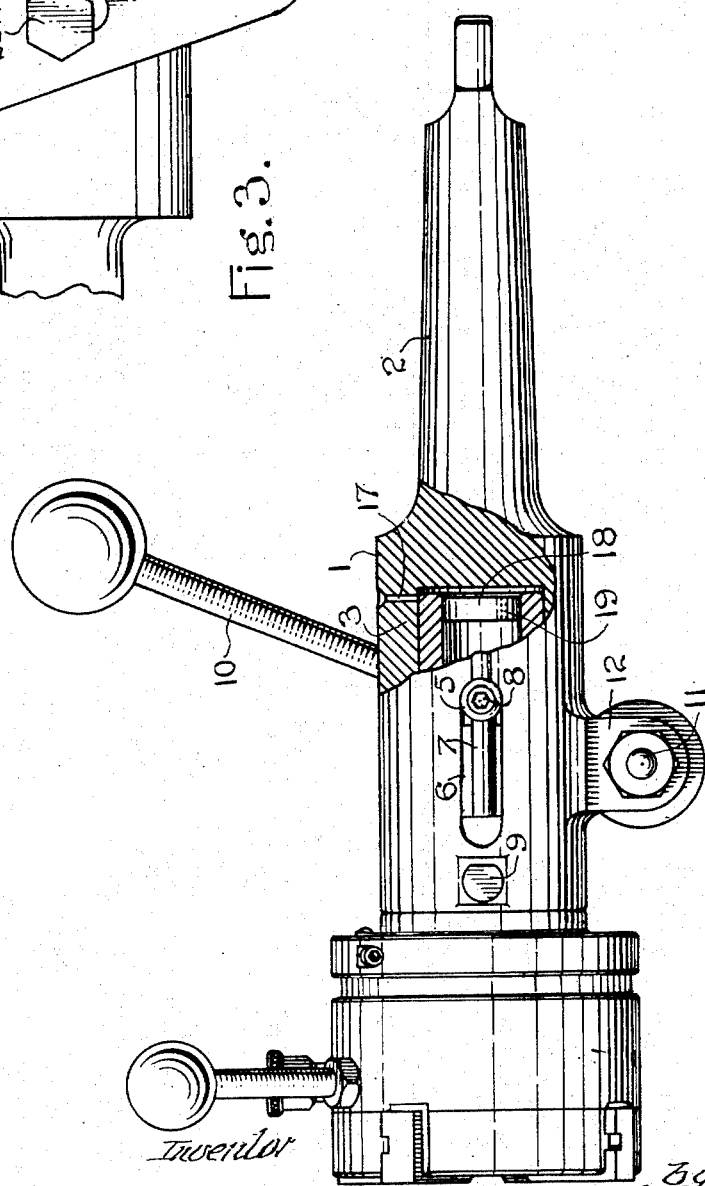
Figure 2 is a front elevation corresponding to Figure 1.

In the form of the appliance illustrated by Figures 1 and 2, a body 1 has a supporting stem 2 which has a Morse taper, so that it will fit in and be supported by the usual or standard tail stock of a centre lathe. The body 1 has a bore 3 in which a tool-holder stem 4 is free to slide, but is prevented from rotating therein by a pin 5 which is fixed in it and projects through a slot 6 in the body.

The pin 5 is drilled to receive a stop pin 7 which can be adjustably secured by a screw 8. The stop pin 7 engages with a fixed stop 9 on the body 1 and limits the outward sliding movement of the tool-holder stem 4. This movement is effected by a hand operating lever 10 which is pivoted on a fulcrum pin 11 carried by a bearing lug 12 on the body 1, the lever passing through a slot 13 in the head 14 with a collar 14a which passes freely through a slot 15 in the body 1, a plain stud 14b being screwed into the tool-holder stem 4 and entering the collar.

The tool-holder stem 4 is shown in this example as fitted with a self-releasing die-head 16 of a type well known in the art.

In use, a spindle or other work piece to be screw-threaded may be set in an ordinary jaw chuck in a centre lathe and steadied by an ordinary steady. The tapered supporting stem 2 is thrust into the tail stock of the lathe after the tail stock has been set in a convenient position on the lathe bed.

The lathe is started and the hand lever 10 is moved to shift the die-head 16 forward to engage with the end of the spindle and to start a thread. Threading continues until the stop pin 5 engages with the fixed stop 9. The resultant pull on the die-head 16 causes it to be opened or released in the usual way. The die-head is then withdrawn from the threaded spindle by the hand lever 10.

The tool-holder stem 4 is hollow to allow the workpiece to enter as the die-head advances on the workpiece.

In order to prevent a vacuum being created in the interior of the body 1 as the tool holder stem 4 is advanced, a vent 17 is provided, and to prevent swarf being drawn into the stem 4, a plug 18 is set in the end thereof. The plug 18 may have a vent hole 19.

Figure 3:
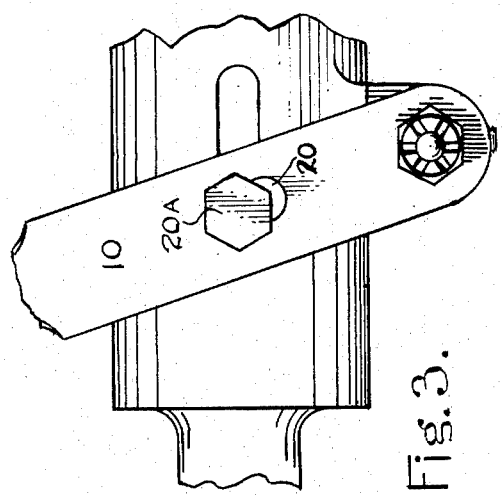
Figure 3 is a fragmentary rear elevational view showing a modified form of the operating lever arrangement.

An alternative form of hand operating lever 10 is shown in Figure 3. It is flat and has a slot 20 through which a headed stud 20A passes and is screwed into the tool-holder stem 4.

In the form of the device shown in Figures 4 and 5, the body 1 is provided with a tapered stem 2 and is bored to receive a sliding tool-holder stem 4 which is reciprocated by a hand lever 21 which is pivotally connected at 22 to a lever 23 which is pivotally mounted on a pin 24 on the body 1. The lever 21 is connected to the tool-holder stem 4 by a pin 25 passing through a slot 15 in the body 1 and fixed in the tool-holder stem 4. A slotted link 26 receives both pins 24 and 25 and is adjustably clamped in position by a nut 27 so as to limit the movement of the hand lever 21. The link can be graduated for setting purposes.

The tool-holder 28 is shown recessed at 29 to receive button-dies, a chuck with collet for a tap or drill as at 29a, or a self-centering head for a tap.

The tool-holder 28 is separate from the tool-holder stem 4 and is free to rotate relatively to it under certain conditions. The tool-holder stem 4 is provided with two outer engagement or clutch members 30 and 31 provided with clutch pins 32 and 33, respectively. The clutch members 30 and 31 are fixed to the stem 4 and compelled to reciprocate therewith.

A central engagement or clutch member 34 is free to rotate on the stem 4 under certain conditions. It is provided with clutch pins 35 and 35a for alternate engagement with the clutch pins 32 and 33. A screw 37 locks the tool-holder 28 to the clutch member 34 and a dowel pin 36 may also be provided, if desired, at the joint 36'.

38 indicates apertures for the discharge of swarf and the supply of cutting oils. Three screws 39 are provided to suit the button die inserted, and to adjust said die and retain the collet head.

Assuming that the tool-holder 28 is fitted with button dies and the stem 2 is thrust into the tail stock of a centre lathe and a piece of work in the chuck of the lathe is to be screw cut, the tool-holder stem 4 is advanced towards the work by the hand lever 21. The stem 4 brings the clutch pins 32 into engagement with the clutch pins 35 so that the central clutch member 34 and the tool-holder 28 are prevented from rotating while the screwing is effected. When the limit of the advance of the tool-holder has been reached, as determined by the link 26 and stop pin 25, the screwing continues until the pins 35 are disengaged from the pins 32 when the tool-holder is first free to rotate with the work-piece. When the lathe is reversed to reverse the rotation of the work-piece, the tool-holder 28 is withdrawn by the lever 21 and consequently the clutch pins 33 engage with the clutch pins 35a and the tool-holder and dies therein are held against rotation to allow the dies to run off or unscrew from the work-piece.

It will be appreciated that the stem 2 need not be a tapered stem.

It may be of any suitable form for mounting in a tool post or other fixture.

I claim:

1. A device for cutting screw threads, drilling and other operations and adapted for use on a machine tool such as a centre lathe, said device comprising a hollow cylindrical body having a longitudinal slot passing through its wall and a stem for fitting in the machine tool to support said device, a tool holder having a stem which is mounted in said body to slide axially therein, a hand lever having a pivotal mounting on said body and operatively engaged with said tool holder stem to reciprocate said stem in said body, a radial pin fixed in said tool holder stem, said pin passing freely through said slot in said body, a radial pin fixed in said body adjacent to the outer end of said slot, and a stop element adjustably supported by one of said pins for engagement by the other of said pins in the advance movement of said tool holder stem, to determine the extent of said advance movement of the tool holder stem.

2. A device for cutting screw threads, drilling and other operations and adapted for use on a machine tool such as a centre lathe, said device comprising a hollow cylindrical body having two circumferentially displaced longitudinal slots passing through its wall and a stem for fitting in a fixture in the machine tool to support said device, a tool holder having a stem which is mounted in said body to slide axially therein, a radial pin fixed in said tool holder stem, said pin passing freely through one of said slots in said body, a hand lever having a pivoted mounting on said body, said hand lever being operatively engaged with said radial pin to reciprocate said tool holder stem in said body, a second radial pin fixed in said tool holder stem, said radial pin passing freely through the other slot in said body, a stop pin adjustably mounted in said second radial pin to lie lengthwise of said other slot and a fixed stop on said body adjacent to the outer end of said other slot for engagement by said stop pin to limit the advance movement of said tool holder.

3. A device for cutting screw-threads and for like purposes and adapted for use on a machine tool such as a centre lathe, said device comprising a hollow cylindrical body having a longitudinal slot passing through its wall and a stem for fitting in a fixture of the machine tool such as a tailstock thereof to support said device, a tool-holder stem mounted for axial sliding movement in said body, a radial pin fixed in said tool-holder stem, said radial pin passing freely through said slot in said body, a hand lever pivotally mounted on said radial pin, a second lever to which said hand lever is pivotally connected, a pivot pin fixed on said body pivotally to support said second lever, a slotted link engaging over said radial pin and over said pivot pin for said second lever, a clamping element on said pivot pin to clamp said slotted link adjustably in position to form at its outer end a stop to determine the advancing movement of said hand lever, a tool holder mounted for free rotation on said tool-holder stem, an engagement member on said tool-holder, cooperating engagement members fixed on said tool-holder stem to engage alternately with said engagement member on the tool-holder as the tool holder stem is advanced and withdrawn, for the purpose of preventing rotation of said tool holder during screwing and unscrewing operations while leaving it free to rotate with the work at the end of the screwing operation.

4. A device for cutting screw-threads and for like purposes and adapted for use on a machine tool such as a centre lathe, said device comprising a hollow cylindrical body having a longitudinal slot passing through its wall and a stem for fitting in a fixture of the machine tool such as a tailstock thereof to support said device, a tool holder stem mounted for axial sliding movement in said body, a radial pin fixed in said tool-holder stem, said radial pin passing freely through said slot in said body, a hand lever pivotally mounted on said radial pin, a second lever to which said hand lever is pivotally connected, a pivot pin fixed on said body pivotally to support said second lever, a slotted link engaging over said radial pin and over said pivot pin for said second lever, a clamping element on said pivot pin to clamp said slotted link adjustably in position to form at one end a stop to determine the advancing movement of said hand lever, and a tool-holder mounted on said tool-holder stem.

TERENCE REGINALD CHRISTOPHER.

REFERENCES CITED

The following references are of record in the file of this patent:

UNITED STATES PATENTS

| Number | Name | Date |
| --- | --- | --- |
| 318,654 | Rathbun | May 26, 1885 |
| 978,855 | Dade | Dec. 20, 1910 |
| 2,147,203 | Kylin | Feb. 14, 1939 |
| 2,384,895 | De Mato | Sept. 18, 1945 |

FOREIGN PATENTS

| Number | Country | Date |
| --- | --- | --- |
| 255,706 | Great Britain | July 29, 1926 |
| 367,001 | Italy | Jan. 13, 1939 |